No. 653,170. Patented July 3, 1900.
C. J. COLEMAN.
MOTOR VEHICLE.
(Application filed Aug. 21, 1899.)
(No Model.)
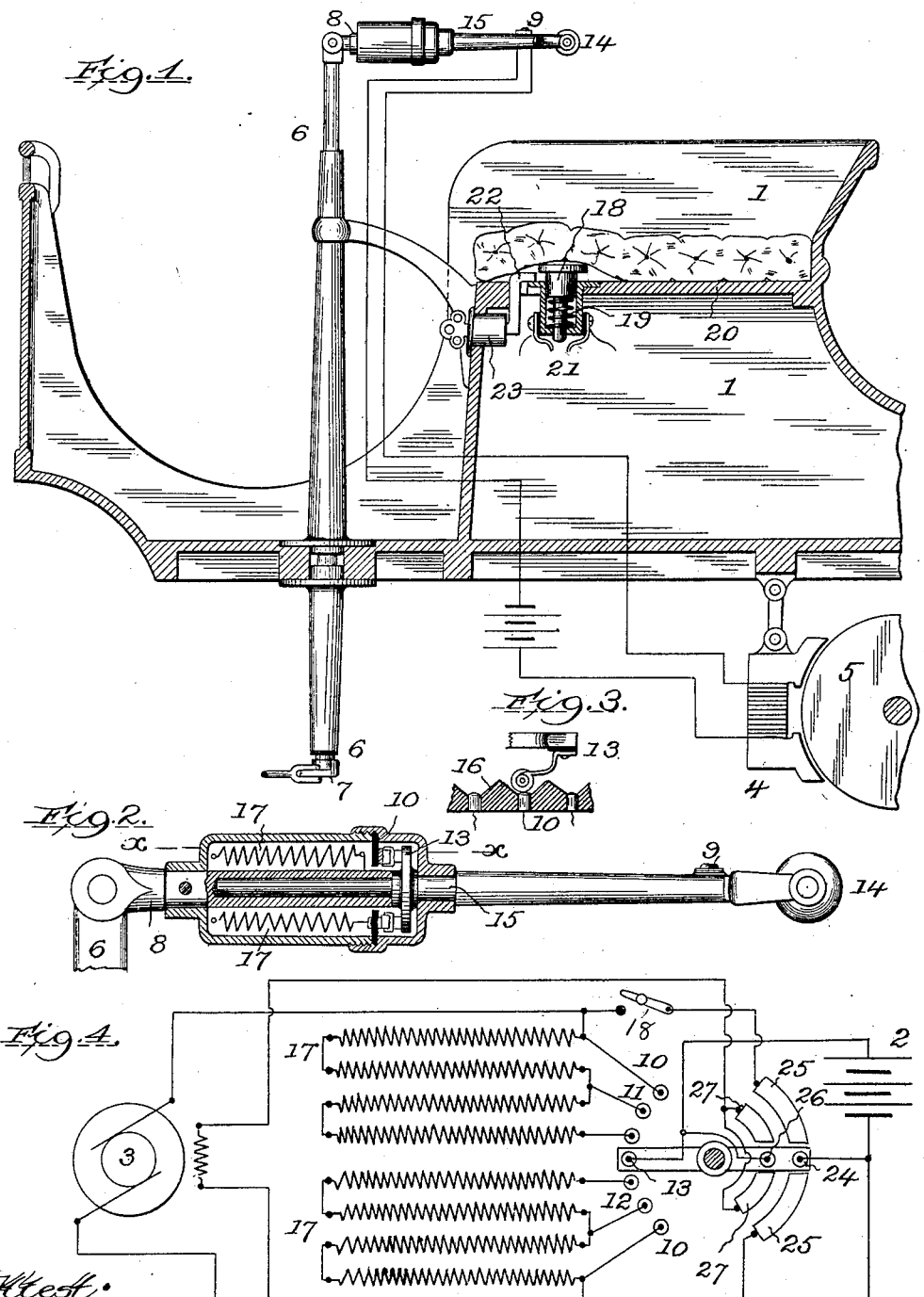

UNITED STATES PATENT OFFICE.

CLYDE J. COLEMAN, OF CHICAGO, ILLINOIS, ASSIGNOR TO THOMAS J. RYAN, OF NEW YORK, N. Y.

MOTOR-VEHICLE.

SPECIFICATION forming part of Letters Patent No. 653,170, dated July 3, 1900.

Application filed August 21, 1899. Serial No. 727,983. (No model.)

*To all whom it may concern:*

Be it known that I, CLYDE J. COLEMAN, a citizen of the United States, residing at Chicago, in the county of Cook and State of Illinois, have invented certain new and useful Improvements in Motor-Vehicles, (Case No. 4;) and I do hereby declare the following to be a full, clear, and exact description of the same, reference being had to the accompanying drawings, forming a part of this specification.

The present invention relates to that class of motor-vehicles in which electricity affords the motive power by which the vehicle is propelled.

One object of the present improvement is to provide a simple convenient combined steering mechanism and current-controlling and current-reversing mechanism adapted for common yet independent operation by the hand of the operator mainly employed in steering the vehicle.

A further object of the present improvement is to provide a simple and efficient arrangement of an electric-brake-actuating mechanism in connection with the steering-handle, so that the same can be operated by the same hand employed in steering the vehicle within a convenient and ready manner.

A still further object of the present improvement is to provide a safety appliance for interrupting the motive current when the seat of the vehicle is not occupied and which is capable of being locked to render the motor mechanism inoperative, all as will hereinafter more fully appear, and be more particularly pointed out in the claims.

In the accompanying drawings, illustrative of the present invention, Figure 1 is a fragmentary section of the seat portion of a motor-vehicle, illustrating the general arrangement of the present invention; Fig. 2, an enlarged detail longitudinal section of the steering-handle embodying the present improved construction; Fig. 3, an enlarged fragmentary section at line $x\ x$, Fig. 2; Fig. 4, a diagram view illustrating the general arrangements of the circuits, current-controller, switches, &c., of the present system.

Similar numerals of reference indicate like parts in the several views.

Referring to the drawings, 1 represents the seat portion of the motor-vehicle; 2, the storage battery or other source of electrical energy; 3, the electric motor by which the vehicle is propelled; 4, the electric brake, and 5 the brake-disk on the motor-shaft or vehicle-axle.

6 is the vertical rock-shaft or steering-stem of the steering mechanism, journaled in suitable bearings on the vehicle-body, its lower end carrying a lateral arm 7, that has operative connection with the axle of the steering-wheels of the vehicle, while its upper end is provided with a horizontally-arranged lever or handle 8, arranged convenient to the operator and affording means for operating the steering mechanism, as usual in the present class of motor-vehicles.

The first part of the present invention involves the combination, with the steering lever or handle 8, of an actuating mechanism for an electric brake mounted upon said handle within convenient reach of the hand of the operator grasping the steering-handle. In the construction shown in Figs. 1 and 2 of the accompanying drawings as illustrative of this part of the present invention, 9 is a push-button switch arranged on the steering-handle, as above set forth, and adapted to open or close the circuit of the electric brake 4. Any other well-known type of circuit-breaker may, however, be used instead of the one shown without departing from the spirit of this part of the present invention.

Another part of the present invention involves the combination, with the steering-handle 8, of the operative mechanism of a current-controller or a combined current controller and reverser carried in a direct manner upon such steering-handle and adapted to be operated in a direct manner by a turning or twisting movement of the free or grip portion of such steering-handle to afford a convenient and effective control of the operative electric current capable of convenient operation by the same hand of the operator grasping the steering handle or lever. In the construction shown in Figs. 1, 2, and 4 of the drawings as illustrative of this part of the present invention, 10 is the stationary member of the combined current-controller and reversing-switch formed by a duplicate series of insulated contacts 11 and 12, that have a segmental arrangement concentric with the pivot-axis of the movable member of the mechanism. In the construction shown a gap is left between the two series of insulated contacts 11 and 12, so that with the movement of such movable member of the controller onto said gap the motive current will be broken and a further continued movement of said movable member or contact-finger will effect a reversal of the motive current from that which had previously prevailed, the motive circuit being properly cross-connected in manner illustrated in Fig. 4 of the drawings to enable such reversal of the motive current to take place.

13 is the movable member or contact-finger of the combined current-controller and reversing-switch of any usual and well-known type, preferably an oscillating contact-finger, that in this part of the present improvement is carried by the arbor portion of the turning-grip or handle portion now to be described.

14 is the handle-grip, usually of the paw-handle form and provided with a cylindrical extension or arbor 15, adapted to fit within the tubular shank or main portion of the steering-handle 8 and adapted to have a turning or semirotary movement therein and around its own axis, the parts being held from longitudinal disengagement in any suitable and well-known manner.

In my preferred construction the spaces between the series of contacts 11 and 12 will be formed or provided with a series of angular projections 16, as shown in Fig. 3, and over which the movable contact member rides in a partly-obstructed manner to indicate to the operator the change from one contact-point to the next adjacent one.

17 are rheostats or variable resistances, the coils of which in my preferred construction are contained within the same casing that incloses the combined current-controller and reversing-switch just described. Such rheostats may, however, be otherwise arranged as the judgment of the constructor may suggest without departing from the spirit of the present invention. Such rheostats or variable resistances are connected in series with the pairs of insulated contacts 11 and 12 of the current-controller and reversing-switch and are adapted by the shifting of the contact-finger 13 to introduce a variable resistance into the motive circuit, as usual to such type of electrical appliances. In cases where an arrangement of the batteries is depended upon to afford a variable electromotive force and current such batteries will be connected to the current controller and reverser in any usual and well-known manner, so as to enable the control of the same in multiple and in series multiple, at the will of the operator, and accordingly the term "current-controller" in the present description is intended to cover, broadly, a means for controlling in a variable manner the electromotive force of the operating electrical circuit of the vehicle regardless of the particular arrangement and connection of such circuit and regardless of the fact that the circuit to the field or to the armature of the vehicle-motor is the circuit which is reversed in effecting a reversal of said motor with the present invention.

Another part of the present invention involves the combination, with the main motor-circuit, of a circuit-breaker arranged in the seat of the vehicle, preferably beneath the cushion thereof, and adapted to be depressed by the weight of the operator occupying the seat to maintain a closed condition of the motor-circuit while such condition prevails and to open or break such circuit when the seat is vacated. In the construction shown in Fig. 1 of the drawings as illustrative of this part of the present invention, 18 is a vertically-moving contact-piece forced upward by a spring 19, so as to normally occupy a position in which its upper end projects a short distance above the top of the seat-board 20, as illustrated in Fig. 1. In this position and with the seat unoccupied the contact-piece 18 will be out of contact with the pair of contact points or plates 21, and the main circuit, in which such contact-points are interposed, will be open or broken. With an occupancy of the seat the contact-piece 18 will be depressed to contact with the plates 21 and close the main circuit and maintain the same in a closed condition during such occupancy of the seat. 22 is a bolt controlled by an ordinary lock mechanism 23 and adapted to lock such circuit-breaker in an open condition against unauthorized use of the vehicle. 24 is an insulated contact-piece carried by the movable member 13 of the controller and connected with the pole of the battery opposite to that to which the contact-piece of the variable resistance, heretofore described, is connected. 25 are segmental contact-plates adapted to have contact with the contact-piece 24, such segmental plates being cross-connected, as illustrated in diagram view, Fig. 4, to the pairs of insulated contact-points of the variable resistances 17 in order to permit of the reversal of the motor-current, as heretofore mentioned. 26 is an insulated contact-piece carried by the movable member 13 of the controller and connected with one pole of the battery. 27 are fixed segmental contact-plates connected through the field of the motor with the other pole of the battery. Such contacts 26 and 27 are adapted to maintain the current upon the field of the motor at all times except when the current-controller has broken the circuit to the armature of the motor, when the circuit to the field will also be broken.

Having thus fully described my said invention, what I claim as new, and desire to secure by Letters Patent, is—

1. In an electrically-propelled vehicle, the combination of a steering-handle, an electric brake and an electric-brake-actuating mechanism mounted upon said handle in convenient relation to the grip portion of such handle, substantially as set forth.

2. In an electrically-propelled vehicle, the combination of a stationary handle, having the usual steering movement and an independent rotative movement, and the operating means of a current-controller mounted directly upon said handle and adapted to be operated by the rotative movement of the handle, substantially as set forth.

3. In an electrically-propelled vehicle, the combination of a steering-handle having the usual steering movement and an independent rotative movement, and a current-controller mounted directly upon said handle and adapted to be operated by the rotative movement of the handle, substantially as set forth.

4. In an electrically-propelled vehicle, the combination of a steering-handle having the usual steering movement and an independent rotative movement and a combined current controller and reverser mounted directly upon said handle and adapted to be operated by the rotative movement of the handle, substantially as set forth.

5. In an electrically-propelled vehicle, the combination of a steering-handle, formed by two members one of which is capable of rotative movement on the other, and the coöperative means of a current-controller, the stationary member of which controller is carried by one handle member and the movable member of such controller by the other and rotative handle member, substantially as set forth.

6. In an electrically-propelled vehicle, the combination of a steering-handle, formed by two members one of which is capable of a rotative movement on the other, and a current-controller, the stationary portion of which controller is carried by one handle member and the movable portion of such controller by the other or rotative handle member, substantially as set forth.

7. In an electrically-propelled vehicle, the combination of a steering-handle, formed by two members one of which is capable of a rotative movement on the other, and a combined current controller and reverser, the stationary portion of which controller and reverser is carried by one handle member, and the movable portion of such controller and reverser by the other and rotative handle member, substantially as set forth.

8. In an electrically-propelled vehicle, the combination with the motor, the source of electric energy, and the circuit connecting the same of a current-controller and an auxiliary circuit-breaker arranged in said circuit and located in the seat-board of the vehicle and adapted to be automatically operated by the occupancy of the seat, to close the circuit, substantially as set forth.

9. In an electrically-propelled vehicle, the combination with the motor, the source of electric energy, and the circuit connecting the same, of a current-controller and an auxiliary vertically-moving circuit-breaker arranged beneath the cushion of the seat and adapted to be automatically operated by the occupancy of the seat to close the circuit, substantially as set forth.

10. In an electrically-propelled vehicle, the combination with the motor, the source of electric energy, and the circuit connecting the same, of a current-controller and an auxiliary circuit-breaker arranged in said circuit and located in the seat-board of the vehicle and adapted to be automatically operated by the occupancy of the seat to close the circuit against its normal tendency to open said circuit, and a lock mechanism for locking said circuit-breaker in its open condition.

In testimony whereof witness my hand this 14th day of August, 1899.

CLYDE J. COLEMAN.

In presence of—
ROBERT BURNS,
M. H. HOLMES.